United States Patent
Yang et al.

(10) Patent No.: US 8,916,770 B2
(45) Date of Patent: Dec. 23, 2014

(54) PHOTOELECTRIC CONVERSION DEVICE

(75) Inventors: Nam-Choul Yang, Suwon-si (KR); Sang-Yeol Hur, Suwon-si (KR); Jong-Ki Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 623 days.

(21) Appl. No.: 12/766,358

(22) Filed: Apr. 23, 2010

(65) Prior Publication Data

US 2011/0100449 A1    May 5, 2011

Related U.S. Application Data

(60) Provisional application No. 61/258,529, filed on Nov. 5, 2009.

(51) Int. Cl.
*H01L 31/0224* (2006.01)
*H01G 9/20* (2006.01)

(52) U.S. Cl.
CPC ........... *H01G 9/2027* (2013.01); *H01G 9/2077* (2013.01); *H01G 9/2059* (2013.01); *Y02E 10/542* (2013.01)
USPC ...................................................... 136/256

(58) Field of Classification Search
USPC ................................. 136/243–265
See application file for complete search history.

(56) References Cited

U.S. PATENT DOCUMENTS

| | | | | |
|---|---|---|---|---|
| 6,118,573 A * | 9/2000 | Kubo et al. | .................... | 359/266 |
| 6,462,266 B1 * | 10/2002 | Kurth | ............................ | 136/251 |
| 2002/0005977 A1 * | 1/2002 | Guarr et al. | .................... | 359/265 |
| 2005/0183769 A1 * | 8/2005 | Nakagawa et al. | ............ | 136/263 |
| 2006/0162770 A1 * | 7/2006 | Matsui et al. | ................. | 136/263 |
| 2009/0272433 A1 | 11/2009 | Morooka et al. | | |

FOREIGN PATENT DOCUMENTS

| | | |
|---|---|---|
| EP | 1 020 881 A2 | 7/2000 |
| EP | 1 137 022 A2 | 9/2001 |
| JP | 2003-203683 | 7/2003 |
| JP | 2006-107892 | 4/2006 |
| JP | 2007-265775 | 10/2007 |
| JP | 2007-280906 | 10/2007 |

OTHER PUBLICATIONS

English machine translation of Morooka et al. (JP 2007-280906), published Oct. 25, 2007.*
European European Search Report dated Jan. 11, 2011, for corresponding European Patent application, 10161210.9.
English abstract and English machine translation of Japanese Publication 2006-107892, 108 pages.

(Continued)

*Primary Examiner* — Jonathan Johnson
*Assistant Examiner* — Christina Chern
(74) *Attorney, Agent, or Firm* — Christie, Parker & Hale, LLP

(57) ABSTRACT

A photoelectric conversion device may effectively prevent an electrolyte from leaking and have a high durability. A photoelectric conversion device includes a first substrate and a second substrate spaced from the first substrate. A plurality of first electrodes are on a side of the first substrate facing the second substrate and extend from a sealing region of the first substrate, and the first electrodes are spaced from each other. A protective layer is on the first electrodes, and an end portion of the protective layer on the sealing region extends continuously across at least two of the first electrodes.

14 Claims, 5 Drawing Sheets

(56) References Cited

OTHER PUBLICATIONS

English abstract and English machine translation of Japanese Publication 2007-265775, 47 pages.

Japanese Office action dated Nov. 20, 2012, for corresponding Japanese Patent application 2010-238360, (1 page).

SIPO Office action dated Jun. 25, 2014, with English translation, for corresponding Chinese Patent application 201010530255.0, (13 pages).

* cited by examiner

PHOTOELECTRIC CONVERSION DEVICE

CROSS-REFERENCE TO RELATED APPLICATIONS

This application claims priority to and the benefit of U.S. Provisional Application No. 61/258,529, filed on Nov. 5, 2009, in the United States Patent and Trademark Office, the disclosure of which is incorporated herein in its entirety by reference.

BACKGROUND

1. Field

Aspects of one or more embodiments of the present invention relate to a photoelectric conversion device.

2. Description of Related Art

Extensive research has been conducted on photoelectric conversion devices that convert light into electric energy. From among such devices, solar cells have attracted much attention as alternative energy sources to fossil fuels.

Wafer-based crystalline silicon solar cells each using a P-N semiconductor junction are in relatively wide use. However, the manufacturing cost of wafer-based crystalline silicon solar cells is high because they are formed of a high purity semiconductor material.

Unlike silicon solar cells, dye-sensitized solar cells include a photosensitive dye that receives visible light and generates excited electrons, a semiconductor material that receives the excited electrons, and an electrolyte that reacts with electrons returning from an external circuit. Since dye-sensitized solar cells have much higher photoelectric conversion efficiency than other general solar cells, the dye-sensitized solar cells are being considered as the next generation solar cells.

SUMMARY

Aspects of one or more embodiments of the present invention relate to a photoelectric conversion device that may effectively prevent an electrolyte from leaking and have high durability.

According to an embodiment of the present invention, a photoelectric conversion device includes a first substrate and a second substrate spaced from the first substrate. A plurality of first electrodes are on a side of the first substrate facing the second substrate and extend from a sealing region of the first substrate. The first electrodes are spaced from each other. A protective layer is on the first electrodes, an end portion of the protective layer on the sealing region extends continuously across at least two of the first electrodes.

A portion of the protective layer on a photoelectric conversion region of the first substrate may include a plurality of spaced apart portions, each covering a corresponding one of the first electrodes.

A portion of the protective layer on a photoelectric conversion region of the first substrate may extend continuously across at least two of the first electrodes.

The photoelectric conversion device may further include a second electrode extending along a border between the sealing region and a peripheral region of the first substrate and coupling the first electrodes to each other.

The protective layer may overlap with at least a portion of the second electrode.

The photoelectric conversion device may further include a sealing member between the first and second substrates, and the sealing member may be at least partly overlapped with the end portion of the protective layer.

The end portion of the protective layer may have a substantially level surface facing the sealing member.

The protective layer may include a resin-based material.

A thickness of the end portion of the protective layer between two adjacent ones of the first electrodes may be at least equal to a thickness of the first electrodes.

The photoelectric conversion device may further include a plurality of third electrodes on a side of the second substrate facing the first substrate, and the third electrodes may extend from a sealing region of the second substrate and are spaced from each other. A second protective layer may be on the third electrodes, and an end portion of the second protective layer on the sealing region of the second substrate may extend continuously across at least two of the third electrodes.

A portion of the second protective layer on a photoelectric conversion region of the second substrate may include a plurality of spaced apart portions, each covering a corresponding one of the third electrodes.

A portion of the second protective layer on a photoelectric conversion region of the second substrate may extend continuously across at least two of the third electrodes.

The photoelectric conversion device may further include a fourth electrode extending along a border between the sealing region of the second substrate and a peripheral region of the second substrate and coupling the third electrodes to each other.

The second protective layer may overlap with at least a portion of the fourth electrode.

The end portion of the second protective layer may have a substantially level surface facing the first substrate.

A thickness of the end portion of the second protective layer between two adjacent ones of the third electrodes may be at least equal to a thickness of the third electrodes.

According to embodiments of the present invention, a protective layer is successively or continuously formed in a sealing area to cover grid patterns that are spaced apart from one another at an interval of an electrode pitch, so that an even or level supporting surface of a sealing member may be obtained by covering steps between the grid patterns, thereby increasing a sealing performance of the sealing member.

Figure 1:
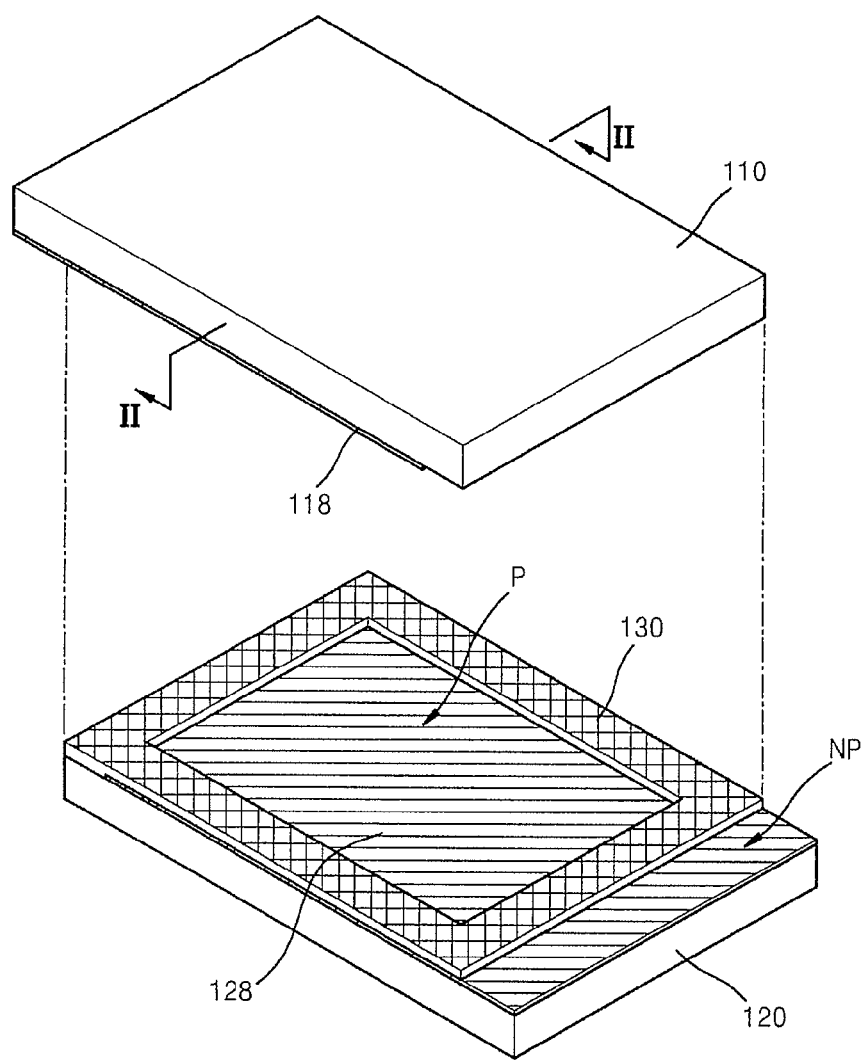
FIG. 1 is an exploded perspective view of a photoelectric conversion device according to an embodiment of the present invention.

EXPLANATION OF REFERENCE NUMERALS DESIGNATING SOME OF THE ELEMENTS OF THE DRAWINGS

110: light receiving substrate
111, 121: transparent conductive layer
113, 123: grid pattern
114: photoelectrode 115, 125: protective layer
116: collector wire pattern
116a: terminal portion of collector wire pattern
117: semiconductor layer
118, 128: functional layer
120: counter substrate
122: catalyst layer
124: counter electrode
130: sealing member
150: electrolyte
160: wire
180: external circuit
P: photoelectric conversion area
NP: peripheral area
S: sealing area
T: step
C: electrode pitch of grid pattern
W: line width of grid pattern

DETAILED DESCRIPTION

Exemplary embodiments of the present invention will now be described with reference to the attached drawings. FIG. 1 is an exploded perspective view of a photoelectric conversion device according to an embodiment of the present invention. Referring to FIG. 1, a light receiving substrate 110 on which a functional layer 118 is formed and a counter substrate 120 on which a functional layer 128 is formed face each other. A sealing member 130 is disposed between the light receiving substrate 110 and the counter substrate 120 along edges of the two substrates to attach them to each other. Then, an electrolyte may be injected into the photoelectric conversion device through an inlet. The sealing member 130 is used to seal the electrolyte between the substrates so that the electrolyte does not leak to the outside, and the sealing member 130 defines a photoelectric conversion area P formed inside the photoelectric conversion device and a peripheral area NP formed outside the photoelectric conversion device.

For example, the functional layers 118 and 128 respectively formed on the light receiving substrate 110 and the counter substrate 120 include a semiconductor layer for generating electrons excited by irradiated light and electrodes for collecting and discharging the generated electrons. For example, a part of the electrode structure including the functional layers 118 and 128 may extend to the outside of the sealing member 130 toward the peripheral area NP to electrically contact with an external circuit.

Figure 2:
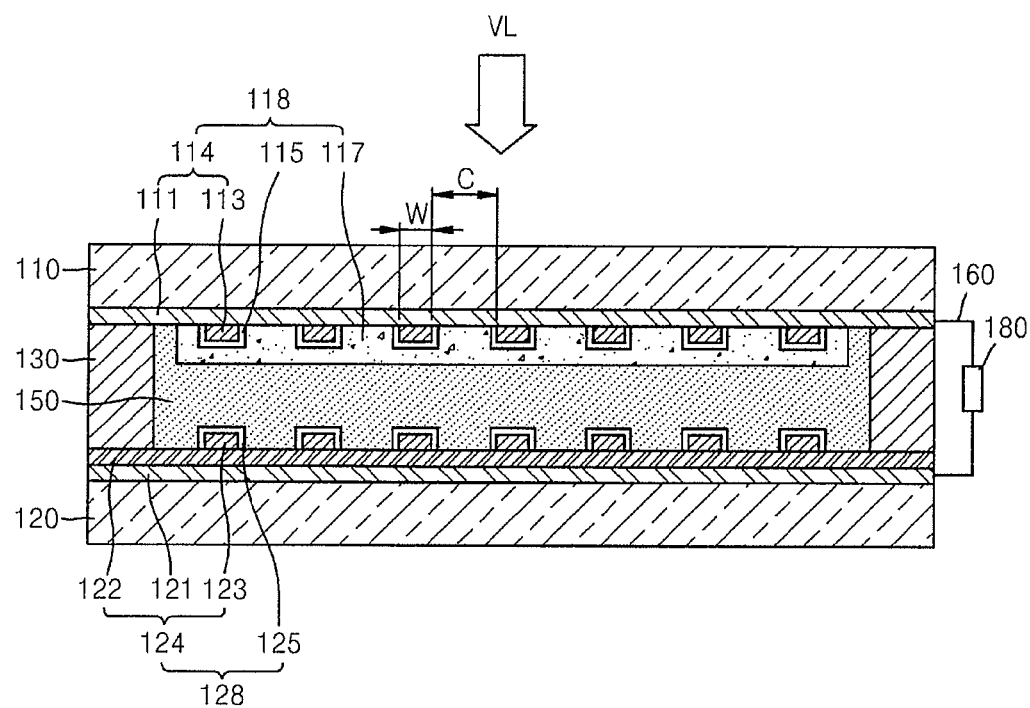
FIG. 2 is a cross-sectional view taken along the line II-II of FIG. 1.

FIG. 2 is a cross-sectional view taken along the line II-II of FIG. 1. Referring to FIG. 2, the light receiving substrate 110 on which the photoelectrode 114 is formed and the counter substrate 120 on which the counter electrode 124 is formed face each other. A photosensitive dye that is excited by light VL is absorbed into a semiconductor layer 117 that is formed on the photoelectrode 114. An electrolyte 150 is filled between the semiconductor layer 117 and the counter electrode 124. For example, the photoelectrode 114 and the semiconductor layer 117 correspond to the functional layer 118 adjacent to the light receiving substrate 110, and the counter electrode 124 correspond to the functional layer 128 adjacent to the counter substrate 120.

The light receiving substrate 110 and the counter substrate 120 are attached to each other using the sealing member 130 so that an interval (e.g., a predetermined interval) is formed therebetween. The sealing member 130 is formed to surround and seal the electrolyte 150 so that the electrolyte 150 does not leak to the outside.

The photoelectrode 114 and the counter electrode 124 are electrically connected to each other by a wire 160 through an external circuit 180. In a module in which a plurality of photoelectric conversion devices are connected in series or in parallel, the photoelectrode 114 and the counter electrode 124 of the photoelectric conversion device may be connected to each other in series or in parallel, and both ends of connected portions may be connected to respective ends of the external circuit 180.

The light receiving substrate 110 may be formed of a transparent material, for example, a material having a high light transmittance. For example, the light receiving substrate 110 may be a glass substrate or a resin film substrate. Since a resin film typically has flexibility, the resin film may be applied to devices requiring flexibility.

The photoelectrode 114 may include a transparent conductive layer 111 and a grid pattern 113 formed on the transparent conductive layer 111. The transparent conductive layer 111 may be formed of a material having transparency and electrical conductivity, for example, a transparent conducting oxide (TCO) such as indium tin oxide (ITO), fluorine tin oxide (FTO), or antimony-doped tin oxide (ATO). The grid pattern 113 is used to reduce the electrical resistance of the photoelectrode 114, and the grid pattern 113 functions as a wire that collects electrons generated by photoelectric conversion and provides a current path having a low resistance. For example, the grid pattern 113 may be formed of a metal material having a high electrical conductivity, such as gold (Ag), silver (Au), or aluminum (Al), and may be patterned in a mesh pattern.

The photoelectrode 114 functions as a negative electrode of the photoelectric conversion device and may have a high aperture ratio. Since light VL incident through the photoelectrode 114 excites the photosensitive dye absorbed into the semiconductor layer 117, the photoelectric conversion efficiency may be improved by increasing the amount of incident light VL.

A protective layer 115 may be further formed on an outer surface of the grid pattern 113. The protective layer 115 prevents the grid pattern 113 from being damaged, for example, from being eroded, when the grid pattern 113 contacts and reacts with the electrolyte 150. The protective layer 115 may be formed of a material that does not react with the electrolyte 150, for example, a curable resin material.

The semiconductor layer 117 may be formed of a suitable semiconductor material such as a material selected from the group consisting of cadmium (Cd), zinc (Zn), indium (In), lead (Pb), molybdenum (Mo), tungsten (W), antimony (Sb), titanium (Ti), silver (Ag), manganese (Mn), tin (Sn), zirconium (Zr), strontium (Sr), gallium (Ga), silicon (Si), and chromium (Cr). Absorbing the photosensitive dye into the semiconductor layer 117 may increase the photoelectric conversion efficiency. For example, the semiconductor layer 117 may be formed by coating a paste of semiconductor particles having a particle diameter of 5 to 1000 nm on the light receiving substrate 110 on which the photoelectrode 114 is formed and applying heat and pressure to a resultant structure.

The photosensitive dye absorbed into the semiconductor layer 117 absorbs light VL passing through the light receiving substrate 110, so that electrons of the photosensitive dye are excited from a ground state. The excited electrons are transferred to a conduction band of the semiconductor layer 117 through electrical contact between the photosensitive dye and the semiconductor layer 117, to the semiconductor layer 117, and to the photoelectrode 114, and the excited electrons are discharged to the outside through the photoelectrode 114, thereby forming a driving current for driving the external circuit 180.

For example, the photosensitive dye absorbed into the semiconductor layer 117 may absorb light VL and excite electrons so as to allow the excited electrons to be rapidly moved to the semiconductor layer 117. The photosensitive dye may be any one of liquid type, semi-solid type, and solid type photosensitive dyes. For example, the photosensitive dye absorbed into the semiconductor layer 117 may be a ruthenium-based photosensitive dye. The photosensitive dye may be absorbed into the semiconductor layer 117 by dipping the light receiving substrate 110 on which the semiconductor layer 117 is formed in a solution including the photosensitive dye.

The electrolyte 150 may be formed of a redox electrolyte including reduced/oxidized (R/O) couples. The electrolyte 150 may be formed of any one of solid type, gel type, and liquid type electrolytes.

The counter substrate 120 facing the light receiving substrate 110 may not be transparent. However, in order to increase photoelectric conversion efficiency, the counter substrate 120 may be formed of a transparent material so as to receive light VL on both sides of the photoelectric conversion device, and the counter substrate 120 may be formed of the same material as that of the light receiving substrate 110. In one embodiment, when the photoelectric conversion device is installed as a building integrated photovoltaic system in a structure, e.g., a window frame, both sides of the photoelectric conversion device may be transparent so that light VL is not blocked and may enter the photoelectric conversion device.

The counter electrode 124 may include a transparent conductive layer 121 and a catalyst layer 122 formed on the transparent conductive layer 121. The transparent conductive layer 121 may be formed of a material having transparency and electrical conductivity, for example, a transparent conductive oxide such as ITO, FTO, or ATO. The catalyst layer 122 may be formed of a reduction catalyzing material for providing electrons to the electrolyte 150, for example, a metal such as platinum (Pt), gold (Ag), silver (Au), copper (Cu), or aluminum (Al), a metal oxide such as a tin oxide, or a carbon-based material such as graphite.

The counter electrode 124 functions as a positive electrode of the photoelectric conversion device, and also as a reduction catalyst for providing electrons to the electrolyte 150. The photosensitive dye absorbed into the semiconductor layer 117 absorbs light VL to excite electrons, and the excited electrons are discharged to the outside of the photoelectric conversion device through the photoelectrode 114. The photosensitive dye losing the electrons through the photoelectrode 114 receives electrons generated by oxidization of the electrolyte 150 to be reduced again, and the oxidized electrolyte 150 is reduced again by electrons passing through the external circuit 180 and reaching the counter electrode 124, thereby completing the operation of the photoelectric conversion device.

Figure 3:
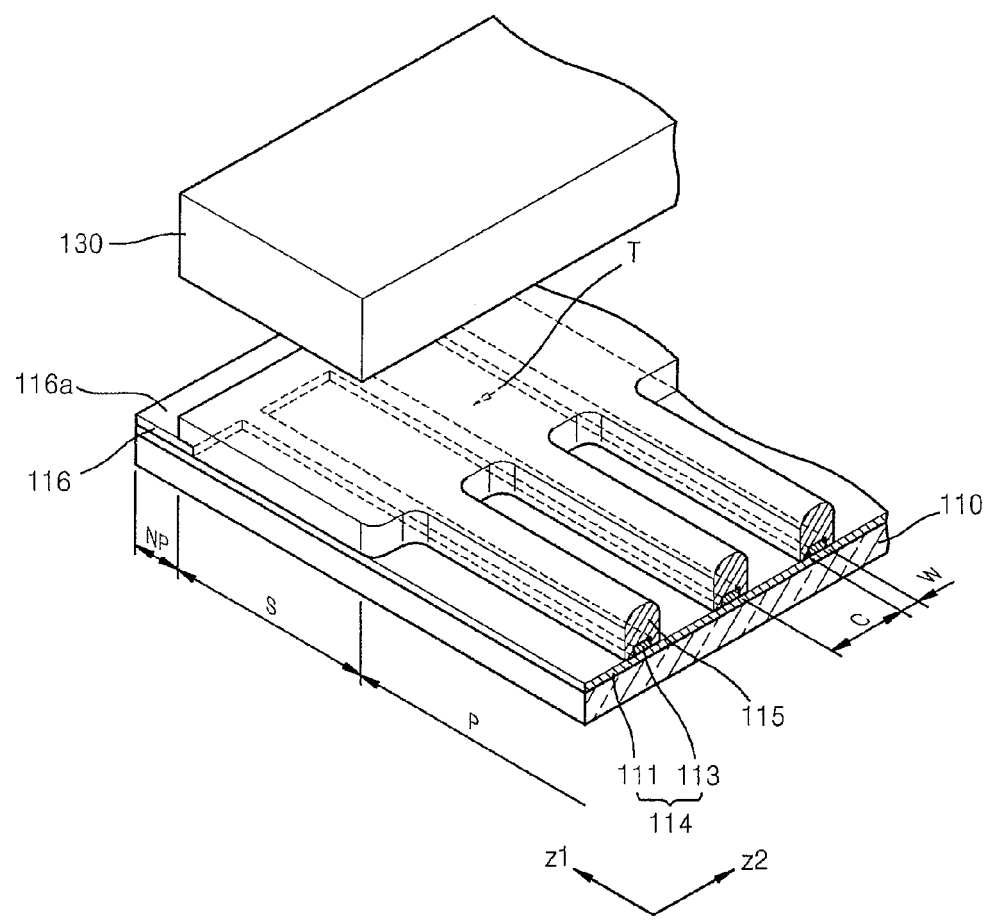
FIG. 3 is a perspective view illustrating a sealing structure of the photoelectric conversion device of FIG. 1, according to an embodiment of the present invention.
Figure 4:
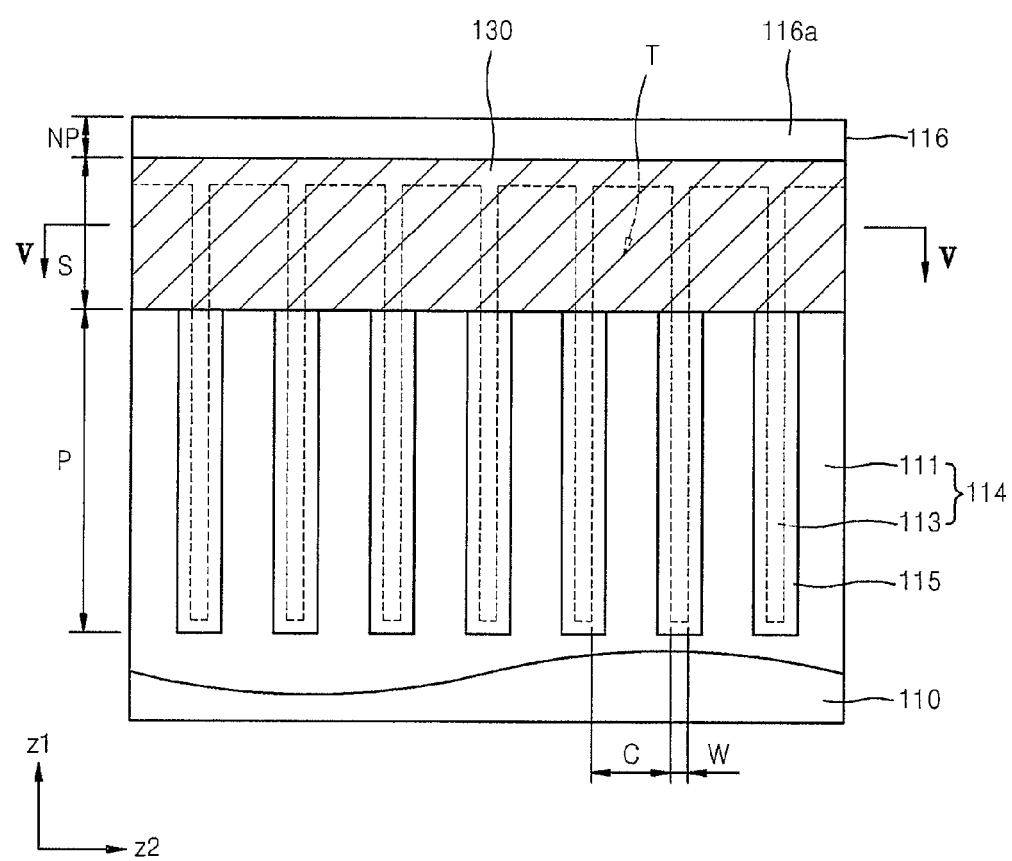
FIG. 4 is a plan view illustrating the sealing structure of the photoelectric conversion device of FIG. 1.

FIG. 3 is a perspective view illustrating a sealing structure of a photoelectric conversion device, according to an embodiment of the present invention. For the convenience of description, the protective layer is illustrated to be magnified in FIG. 3. FIG. 4 is a plan view illustrating a sealing structure of the photoelectric conversion device. Referring to FIGS. 3 and 4, a transparent conductive layer 111, grid patterns 113, and a collector wire pattern 116 are formed on the light receiving substrate 110. The grid patterns 113 are formed on the transparent conductive layer 111 and extend in parallel in a direction z1. The collector wire pattern 116 extends in a direction z2 crossing the direction z1 and couples the grid patterns 113 to each other. Reference numerals C and W denote a distance between the adjacent electrodes (i.e., adjacent grid patterns 113) and a line width of the grid pattern 113, respectively.

Main portions of the grid patterns 113 are disposed in a photoelectric conversion area P, and the collector wire pattern 116 is disposed in a peripheral area NP. A sealing area S separates the photoelectric conversion area P and the peripheral area NP. In order to increase an aperture ratio of the photoelectric conversion area P, the opaque collector wire pattern 116 may be formed in the peripheral area NP. The sealing member 130 is formed in the sealing area S.

The grid patterns 113 are covered with the protective layer 115. The protective layer 115 covering the grid patterns 113 may extend on the collector wire pattern 116 to partially cover the collector wire pattern 116. A terminal portion (or end portion) 116a of the collector wire pattern 116 may be exposed and not covered by the protective layer 115 to contact an external circuit.

A portion of the protective layer 115 is successively formed (or extends continuously) in the sealing area S not to be interrupted. That is, the portion of the protective layer 115 is formed across the grid patterns 113, which are spaced apart from one another by a distance C, to cover a step T between the grid patterns 113. The portion of the protective layer 115 in the sealing area S provides an even (or level) supporting surface to the sealing member 130 by covering the step T between the grid patterns 113 and protects the grid patterns 113.

Figure 5:
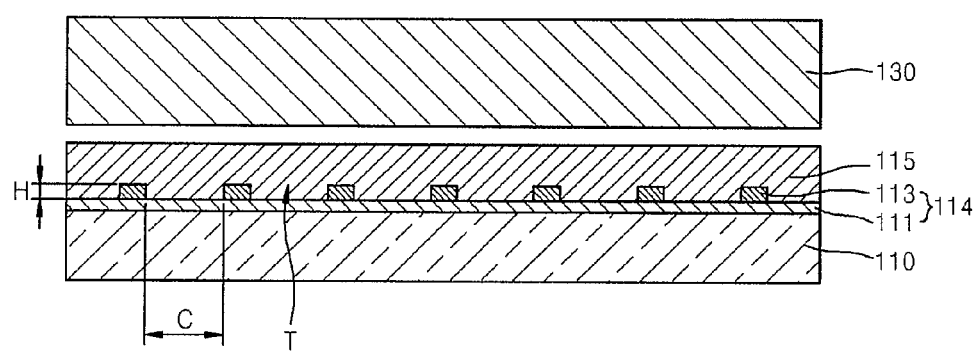
FIG. 5 is a cross-sectional view taken along the line V-V of FIG. 4.

FIG. 5 is a cross-sectional view taken along the line V-V of FIG. 4. For the convenience of description, the protective layer is illustrated to be magnified in FIG. 5. Referring to FIG. 5, the grid patterns 113 are formed on the transparent conductive layer 111 and are spaced apart from one another by the distance C. The protective layer 115 is formed across the grid patterns 113 and covers the transparent conductive layer 111 between the grid patterns 113.

Since the grid patterns 113 have a height H corresponding to a thickness of an electrode on the transparent conductive layer 111, a step T (e.g., a predetermined step) is formed between the grid patterns 113 and the transparent conductive layer 111. The protective layer 115 is successively (or continuously) formed in the sealing area S, so that the protective layer 115 covers the step T, thereby providing an even upper surface. The sealing member 130 is disposed on the even surface of the portion of the protective layer 115 that ensures a stable supporting surface, thereby increasing reliability and durability of sealing. That is, the sealing member 130 and the protective layer 115 may be closely attached to each other by reducing the step-coverage (i.e., step T) which should be absorbed or filled by the sealing member 130, thereby effectively preventing the electrolyte 150 from leaking.

Figure 6:
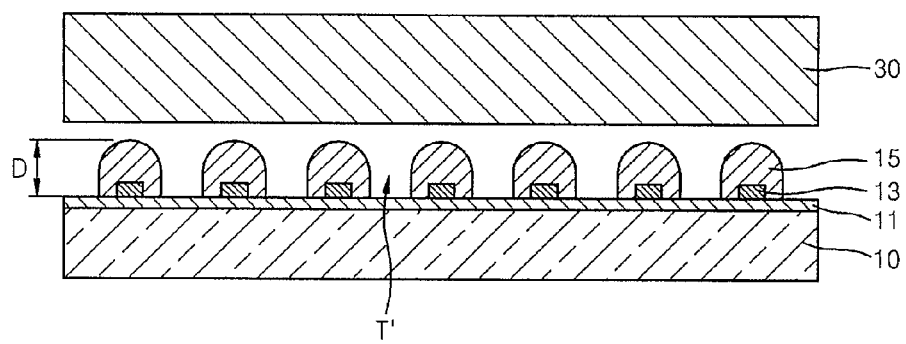
FIG. 6 is a cross-sectional view of a photoelectric conversion device, according to a comparative example to the present invention.

FIG. 6 is a cross-sectional view of a photoelectric conversion device, according to a comparative example to the present invention. Referring to FIG. 6, a plurality of grid patterns 13 are disposed on a transparent conductive layer 11, and a plurality of protective layers 15 are each disposed on a corresponding one of the grid patterns 13. The protective layers 15 are formed discontinuously to cover each of the grid patterns 13. That is, the transparent conductive layer 11 formed between the grid patterns 13 is not covered by the protective layers 15 and is thus exposed to the outside. A sealing member 30 penetrates up to an exposed surface of the transparent conductive layer 11 between the protective layers 15, that is, penetrates by a step depth D so as to completely cover a step T' between the protective layers 15, thereby sealing an electrolyte 150 (shown in FIG. 2) therein. Accordingly, the sealing member 30 requires a high step-coverage, which may restrict the sealing member 30 to a specific material and a processing method. In particular, if a sealing performance of the sealing member 30 is decreased, the sealing member 30 may be separated from the transparent conductive layer 11, thereby allowing the electrolyte 150 to leak to the outside.

In the structures illustrated in FIGS. 3 and 5, the step T between the grid patterns 113 may be covered by successively forming a portion of the protective layer 115 in the sealing area S that extends across the grid patterns 113, and thus an even supporting surface to the sealing member 130 may be provided. Further, the technical details described with reference to FIGS. 3 through 4 may be applied substantially the same for the counter substrate 120 on which the counter electrode 124 is formed. In one embodiment, a portion of the protective layer 125 is successively formed across the grid patterns 123 so as to provide an even supporting surface to the sealing member 130, thereby increasing a sealing performance of the sealing member 130.

In one embodiment, a portion of the protective layer 115 on the photoelectric conversion region P of the substrate 110 includes a plurality of spaced apart portions, each covering a corresponding one of the grid patterns 113.

In another embodiment, a portion of the protective layer 115 on the photoelectric conversion region P of the substrate 110 extends continuously across at least two of the grid patterns 113.

While aspects of the present invention have been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A photoelectric conversion device comprising:
    a first substrate and a second substrate spaced from the first substrate;
    a plurality of first electrodes on a side of the first substrate facing the second substrate and extending from a sealing region of the first substrate, the first electrodes being spaced from each other;
    a first protective layer on the first electrodes, an end portion of the first protective layer on the sealing region extending continuously across at least two of the first electrodes;
    a sealing member between the first and second substrates, the sealing member being at least partly overlapped with the end portion of the first protective layer;
    a plurality of third electrodes on a side of the second substrate facing the first substrate and extending from a sealing region of the second substrate, the third electrodes being spaced from each other; and
    a second protective layer on the third electrodes, an end portion of the second protective layer on the sealing region of the second substrate extending continuously across at least two of the third electrodes.

2. The photoelectric conversion device of claim 1, wherein a portion of the first protective layer on a photoelectric conversion region of the first substrate comprises a plurality of spaced apart portions, each covering a corresponding one of the first electrodes.

3. The photoelectric conversion device of claim 1, wherein a portion of the first protective layer on a photoelectric conversion region of the first substrate extends continuously across at least two of the first electrodes.

4. The photoelectric conversion device of claim 1, further comprising a second electrode extending along a border between the sealing region and a peripheral region of the first substrate and coupling the first electrodes to each other.

5. The photoelectric conversion device of claim 4, wherein the first protective layer overlaps with at least a portion of the second electrode.

6. The photoelectric conversion device of claim 1, wherein the end portion of the first protective layer has a substantially level surface facing the sealing member.

7. The photoelectric conversion device of claim 1, wherein the first protective layer comprises a resin-based material.

8. The photoelectric conversion device of claim 1, wherein a thickness of the end portion of the first protective layer between two adjacent ones of the first electrodes is greater than or equal to a thickness of the first electrodes.

9. The photoelectric conversion device of claim 1, wherein a portion of the second protective layer on a photoelectric conversion region of the second substrate comprises a plurality of spaced apart portions, each covering a corresponding one of the third electrodes.

10. The photoelectric conversion device of claim 1, wherein a portion of the second protective layer on a photoelectric conversion region of the second substrate extends continuously across at least two of the third electrodes.

11. The photoelectric conversion device of claim 1, further comprising a fourth electrode extending along a border between the sealing region of the second substrate and a peripheral region of the second substrate and coupling the third electrodes to each other.

12. The photoelectric conversion device of claim 11, wherein the second protective layer overlaps with at least a portion of the fourth electrode.

13. The photoelectric conversion device of claim 1, wherein the end portion of the second protective layer has a substantially level surface facing the first substrate.

14. The photoelectric conversion device of claim 1, wherein a thickness of the end portion of the second protective layer between two adjacent ones of the third electrodes is greater than or equal to a thickness of the third electrodes.

* * * * *